April 22, 1969  A. G. MAKOWSKI  3,440,310
METHOD FOR RAPID EXTRUSION OF PARISON IN BLOW MOLDING OPERATION
Filed May 23, 1966
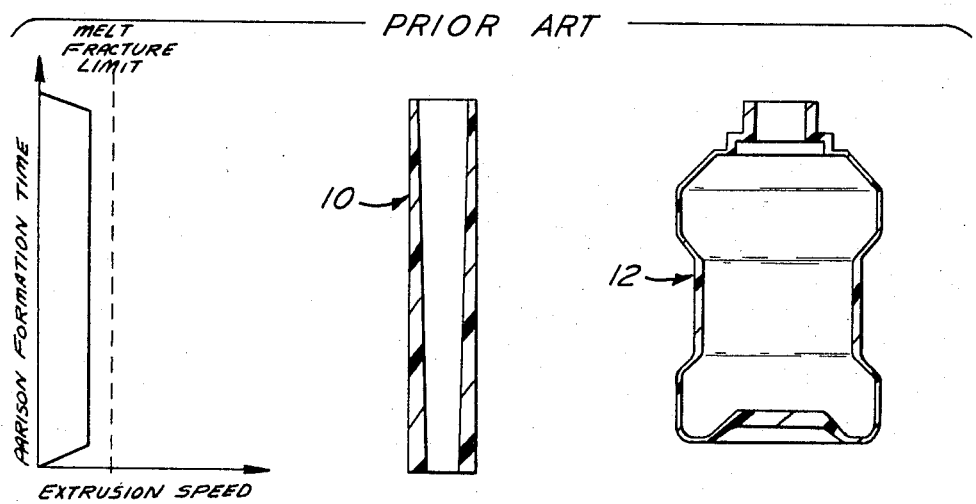
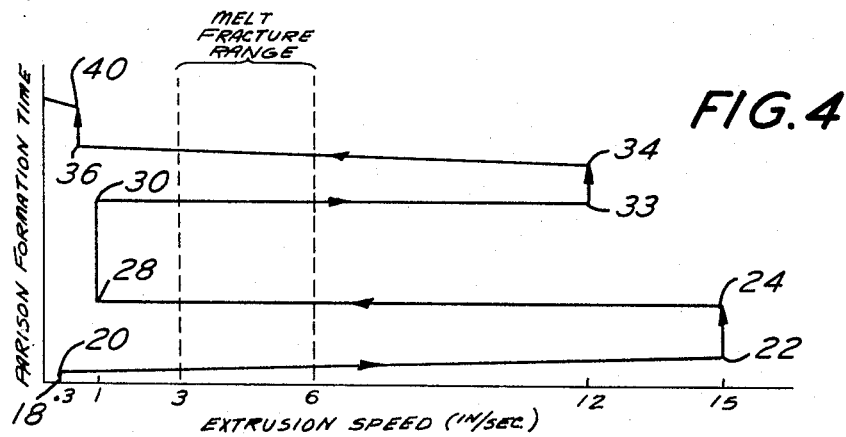
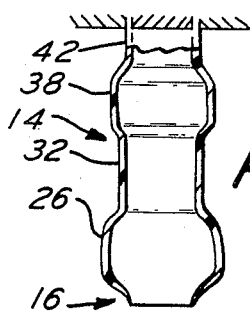
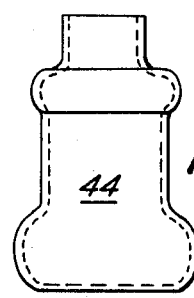
INVENTOR
ALEXANDER G. MAKOWSKI
BY Seidel & Gonda
ATTORNEYS.

April 22, 1969      A. G. MAKOWSKI      3,440,310
METHOD FOR RAPID EXTRUSION OF PARISON IN BLOW MOLDING OPERATION
Filed May 23, 1966
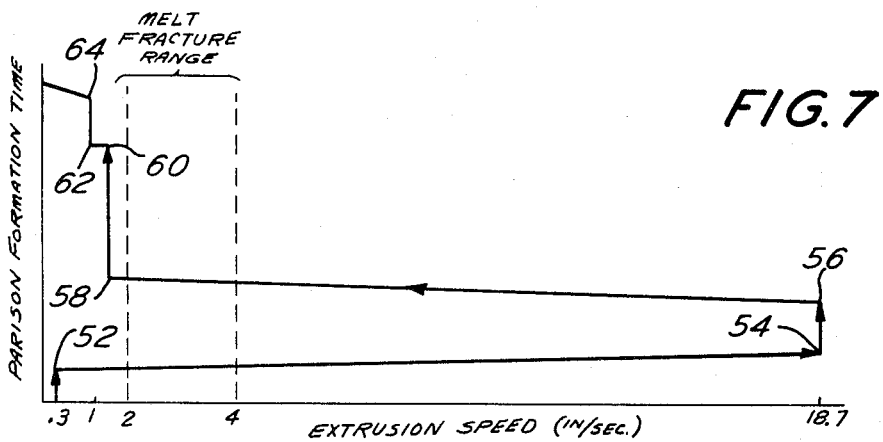
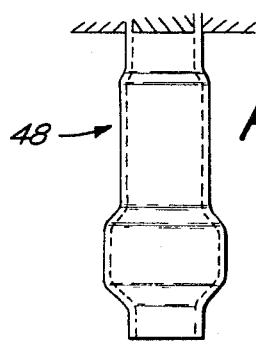
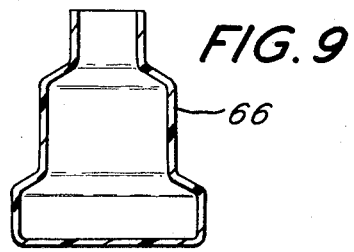
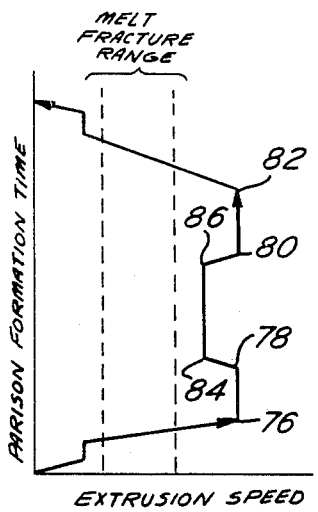
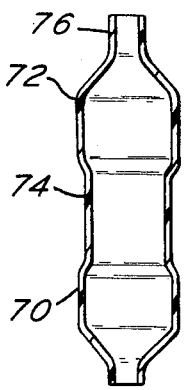
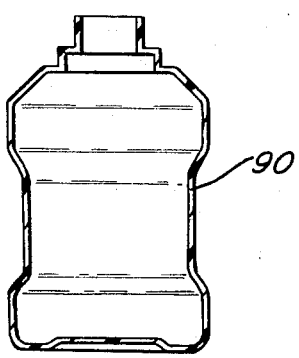
INVENTOR
ALEXANDER G. MAKOWSKI
BY
ATTORNEYS.

United States Patent Office 3,440,310
Patented Apr. 22, 1969

3,440,310
METHOD FOR RAPID EXTRUSION OF PARISON IN BLOW MOLDING OPERATION
Alexander G. Makowski, Wilmington, Del., assignor to Container Corporation of America, Wilmington, Del., a corporation of Delaware
Filed May 23, 1966, Ser. No. 551,967
Int. Cl. B29d 23/03, 23/04
U.S. Cl. 264—98                                      6 Claims

ABSTRACT OF THE DISCLOSURE

A method is disclosed for rapidly extruding parisons having non-uniform wall thickness. Melt fracture is a function of speed and temperature. Melt fracture occurs over a range. Extrusion of the parison is accomplished in a manner so that one portion of the parison is extruded at a speed below the melt fracture range. Another portion of the parison is extruded at a speed above the melt fracture range.

---

This invention relates to the art of blow molding, and more particularly to the blow molding of thermoplastic materials of the polyolefin type such as polyethylene. The invention comprehends an improvement in the method employed for the extrusion of the parison used in the formation of a plastic article by blow molding.

The art of forming thermoplastics into hollow shapes was evolved about twenty years ago from methods then used for blowing glass. The early art and patents teach the idea of forming of a hot gob of plastic around a pin and then blowing it into shape. This early concept was gradually improved and eventually became one of the blow molding methods currently used, namely, injection blow molding. A main advantage of this process is that it permits the formation of a completed container without a tail and with a neck finish molded to final dimensions. Also, the parison can be preformed to arrive at optimum material distribution in the finished container. This method is costly, however, as it requires a double set of molds, one for molding the parison and a second set for use in the blow molding operation.

At the present time, injection blow molding is being used mostly for small containers, because of its limitations, and there has been much effort devoted to the so-called free extrusion blow molding process wherein a parison is formed into hollow tubing and then blown directly into the final shape in a mold.

Although some advances have been made in the control of parison forming, improvements in the process during the past ten years have been largely concentrated in the area of minor improvements rather than in major modifications needed to eliminate basic deficiencies such as:

(1) Inability to form parisons at high speeds;
(2) Inability to precondition the parison between the forming and blowing cycles to obtain better material distribution and to reduce parison temperature prior to molding; and
(3) Long blowing and cooling cycles due to non-uniform material distribution and excessive material temperatures made worse through poor heat conductivity of the material used.

It is obviously highly desirable to increase the speed at which the parison is extruded for two primary reasons: first, to increase the overall speed and efficiency of the operation to provide more finished articles within a given period of time, and second, to prevent the parison from cooling too much before the final article is formed by the blow molding operation.

Another significant deficiency in the methods of blow molding currently employed is the lack of control of the distribution of the material throughout the molded article. In order for blow molding operation to be efficient it is essential that the final molded article have the maximum strength where needed, that is, in the critical areas of stress, and at the same time that a minimum amount of material be used. The use of excess material is not only costly, but it also slows down the molding operation because the thicker sections of the molded article require a greater length of time to cool before they can be removed from the mold without the danger of deformation.

In the past one of the primary factors which has prevented the attainment of greater speed and efficiency in blow molding operations has been the limitations of the physical properties of the material used on the rate at which the parison could be extruded. It has been well accepted that, for any given set of conditions with respect to the type of plastic material, and the contour of the extrusion die orifice, used if a parison is extruded at an excessive rate of speed the outside surface of the parison becomes so rough and uneven as to render the final molded product unacceptable for commercial use.

It is therefore a primary object of this invention to provide in a free extrusion blow molding operation a method permitting extrusion of the parison at a lineal rate far in excess of any rate of extrusion heretofore used successfully in blow molding operation and a product produced thereby.

A more particular object of the invention is the provision of a method for rapidly extruding a parison for use in a blow molding operation which provides a far greater degree of control of the distribution of the material throughout the molded article than has been possible in the past.

It is another object to extrude a plastic parison at speeds above and below the melt fracture range.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a graph illustrating the commonly accepted relationship between the rate of speed of extrusion of a parison for blow molding and the relationship with the melt fracture range.

FIGURE 2 is a longitudinal sectional view of a parison made in accordance with the graphs in FIGURE 1, but accentuated slightly to illustrate the non-uniform wall thickness.

FIGURE 3 is a sectional view of a container made in accordance with commonly accepted techniques and the parison of FIGURE 2, but slightly exaggerated to indicate the non-uniform wall thickness.

FIGURE 4 is a graph of extrusion speed versus parison formation time in accordance with the present invention.

FIGURE 5 is a sectional view of a parison made in accordance with a conventional machine operating at the extrusion rate-parison formation time graph illustrated in FIGURE 4.

FIGURE 6 is a sectional view of a bottle made in accordance with the parison in FIGURE 5.

FIGURE 7 is a graph similar to FIGURE 4 but illustrating another operative example in accordance with the present invention.

FIGURE 8 is a sectional view of a parison similar to FIGURE 5 but based on the extrusion speed-parison forming time graph of FIGURE 7.

FIGURE 9 is a sectional view of a bottle made in accordance with the parison of FIGURE 8.

FIGURE 10 is a graph similar to FIGURE 4 but illustrating another operative example in accordance with the present invention.

FIGURE 11 is a sectional view of a parison similar to FIGURE 5 but based on the extrusion speed-parison forming time graph of FIGURE 10.

FIGURE 12 is a sectional view of a bottle made with the parison of FIGURE 11.

Referring now to the drawings, for a better understanding of the invention, it will be noted that FIGURES 1–3 illustrate what may be termed as the prior art. In FIGURE 1, there is illustrated an extrusion speed-parison forming time graph wherein the maximum rate of extrusion is below the limit designated by the dotted line for the particular material. It was believed that extrusion at speeds above that limit would produce unacceptable parisons. A hollow parison 10 as shown in FIGURE 2 and produced with an extrusion speed-parison forming time relationship as illustrated in FIGURE 1 results in the formation of a parison 10 which is generally of uniform cross section with a slight taper on the inside diameter so that as the parison 10 becomes longer and longer, the wall thickness becomes thinner due to the dead weight of the parison 10 which causes the parison 10 to stretch. A bottle 12 as illustrated in FIGURE 3 and formed from the parison 10 has non-uniform wall thickness when the bottle is of a multi-diameter type as illustrated. It will be noted that the minimum wall thickness on the bottle 12 occurs where there is a change in diameter and at the corners. This variance in wall thickness is known as poor distribution.

The extrusion speed on the graph in FIGURE 1 is at all times below what is referred to hereinafter as the melt fracture range. When extrusion speed is sufficiently high so as to be in the melt fracture range, surface roughness goes beyond acceptable point producing a so-called "melt fracture." Since the problems in the parison effected by longitudinal stress are less severe than the surface roughness problem, prior art devices have operated in an extrusion speed range which is below the melt fracture range. The prior art did not appreciate that melt fracture problems occur in a range.

In accordance with the present invention, the extrusion speed is varied during the extrusion of a parison so as to be above and below the melt fracture range, with changes of the extrusion speed through the melt fracture range being rapid. Thus, the extrusion rate is greatly increased so as to eliminate stretching of the parison while at the same time producing a parison having different diameters along its length generally commensurate with the different diameters of the end product along its length. As a result of this preconditioning of the hollow parison, substantially better material distribution is obtained, as well as shorter blowing and cooling cycles.

I have found that the melt fracture range is dependent upon a multitude of factors including temperature, extrusion die design, the molecular structure of the material, etc. Therefore, the extrusion velocities indicated hereinafter are only relative values under the environments described and are not absolute limits for the melt fracture range. For polyolefin materials, especially polyethylene, there is a definite melt fracture range which can be found and exceeded. However, I have not been able to formulate a means for predicting where the melt fracture range will appear.

Referring to FIGURE 4, the material being extruded is polyethylene having a density of 0.96 gram per cubic centimeter, the temperature was between 320° F.–380° F. and preferably at 330° F., and the melt index was 1.0. The hollow parison 14 was extruded through an annular passage wherein the inner diameter of the passage was .580 inch in diameter, and the outside diameter of the passage was .64 inch in diameter. Portion 16 of parison 14 was affected by extruding at a speed of .3 inch per second indicated between points 18 and 20. The extrusion speed was immediately increased to a rate of 15 inches per second and continued at that speed as indicated by the points 22 and 24. While extruding parison 14 between points 22 and 24, portion 26 was formed. It will be noted that the diameter and wall thickness of portion 26 is greater than that of portion 16.

Beginning at point 24, the speed was immediately reduced down to point 28. From point 28 to point 30, the extrusion speed was approximately 1 inch per second. During this portion of the extrusion cycle, portion 32 was formed on parison 14. Thereafter, the speed was increased again to point 33 and extrusion continued until point 34. Between points 33 and 34, the extrusion rate was 12 inches per second.

Thereafter, the extrusion rate was decreased from point 34 to point 36 and completed within a short period thereafter with the rate being .6 inch per second. Between points 33 and 34, portion 38 was formed on parison 14. Between points 36 and 40, portion 42 was formed on parison 14. For this particular material and under the conditions indicated, the melt fracture range is between 3 and 6 inches per second. It will be noted that the extrusion rate crossed the melt fracture range four times. Each time the melt fracture range was crossed or entered, a slight roughness was noted on the I.D. of the container 44 shown in FIGURE 6. Since the slight roughness was on the inside of the container, it did not affect the commerciability of the container. However, it will be noted that the wall thickness of container 44 is more uniform than that of container 12.

Each time that the extrusion rate was proceeding at a speed which is above the melt fracture zone, the O.D. of the parison 14 changed so as to provide a preconditioning of the parison commensurate with the intended overall configuration of the container. This preconditioning results in a predistribution of the material. It will be apparent to those skilled in the art that assuming all other extrusion factors are kept at a constant rate or level, the speed of extrusion is directly proportional to the pressure applied to the material. If the speed of extrusion is increased, the pressure applied to the material was increased and the growth rate of the parison, both in thickness of the material and diameter will be increased proportionally as it leaves the extrusion die head. Thus, by controlling the rate of extrusion of the parison as it leaves the die head, the growth rate of the parison can be controlled. Conventional techniques may be utilized for varying the pressure on the material to thereby vary the extrusion rate.

In FIGURE 7, there is illustrated a graph for another example of the present invention. Parison 48 shown in FIGURE 8 was extruded in accordance with the cycle illustrated in FIGURE 7. In view of the above discussion of FIGURES 4 and 5, a more detailed description of FIGURE 7 is not deemed necessary. It will be noted that in connection with FIGURE 7 the extrusion rate crossed the melt fracture range twice with the majority of the length of the parison 48 being extruded at a speed which was below the melt fracture range. In connection with the graph illustrated in FIGURE 7, the extrusion speeds were in accordance with the following table:

| | Inches per second |
|---|---|
| Between points 50 and 52 | .3 |
| Between points 54 and 56 | 18.7 |
| Between points 58 and 60 | 1.3 |
| Between points 62 and 64 | 1.0 |

In connection with FIGURES 7 and 8, the material extruded was the same as that described above except that the temperature was 325° F. The I.D. of the extrusion orifice was .400 inch and the O.D. was .440 inch. With these minor changes, the melt fracture range was between 2 inches per second and 4 inches per second. Thus, it will be noted that the range decreased in width and in speed whereas the temperature was only slightly reduced and the diameter of the parison was substantially reduced. Bottle 66 in FIGURE 9 was produced with parison 48.

In FIGURE 10, there is illustrated a graph similar to the graphs of FIGURES 4 and 7, but in connection with another example for producing the parison illustrated in FIGURE 11 which in turn will be utilized to produce the container 90 illustrated in FIGURE 12. The extrusion conditions of FIGURE 10 are those of FIGURE 4.

The parison in FIGURE 11 has portions 70 and 72 of uniform diameter spaced from one another. These portions are interconnected by portion 74 of smaller diameter and wall thickness. Portions 70 and 72 were produced by extruding the parison at a uniform rate above the upper limit of the melt fracture range as indicated by points 76, 78 and 80, 82 respectively. Portion 74 of the parison in FIGURE 10 was formed by extruding at a rate slightly lower than the rate at which portions 70 and 72 were extruded, but still above the upper limit of the melt fracture range as indicated by points 84 and 86. The conditions and materials utilized in connection with the graph of FIGURE 10 correspond with those of FIGURE 4.

Extrusion of the hollow parisons of polyethylene or polyvinylchloride may be accomplished by using a conventional extruder having a continuously rotating feed screw or reciprocating plunger. During extrusion, temperature is maintained constant. The pressure on the polymeric material is controlled by controlling the speed of rotation of the screw, for example.

The present invention provides an unexpected benefit in elimination of stretch. Not only does the parison not stretch during forming, but distribution is controlled as described above to vary the wall thickness of the parison along its length. The exact reasons for these results are not known. It is believed that an explanation of these results may be as follows: Long chain molecules of high density polyethylene exist in the form of tightly coiled bunches, zig-zags, etc. I surmise that very high shear rates experienced during high speed forming of parisons straighten these molecular chains, similar to the unjamming of a log jam in a river, and permits uniform smooth extrusion. The energy introduced during that operation permits reforming of molecular chains to their original position and relationship. It is also theorized that if energy introduced is high enough, resulting entanglements between chains may be more complex than originally and produce a container with superior physical characteristics. The beneficial effects of high shear rate on a container have not as yet been fully determined by laboratory testing. However, indications are that the stiffness of the container is improved. The parisons formed under the conditions of the present invention exhibit unusual stability where after original "shrink back" has taken place, the parison can be left in its free position for prolonged periods before transfer to the blow molding dies.

I claim:

1. In a method of extruding a hollow parison of polymeric plastic material comprising the steps of producing a hollow parison having different diameters along its length corresponding to the speeds of which the parison was extruded, said step including extruding one portion of the parison at a speed below its melt fracture range, extruding another portion of the parison at a speed above its melt fracture range, and said extruding steps being accomplished with the material having a temperature between 320° F. and 380° F.

2. A method in accordance with claim 1 including extruding still another portion of the parison at a speed above the melt fracture range but different from the first-mentioned speed above the melt fracture range.

3. A method in accordance with claim 2 including extruding still another portion of the parison at a speed below the melt fracture range but different from the first-mentioned speed below the melt fracture range.

4. A method in accordance with claim 1 including the step of blow molding the parison into a container.

5. The method of forming a hollow article, such as a bottle, of polymeric plastic material, which comprises the following steps:
 (a) forming a parison having first, second and third portions with three different diameters by extruding said material, at a constant temperature, in tubular form through an extrusion die orifice, having a fixed configuration, at different lineal rates of extrusion including:
  (i) extruding said first portion at a rate below the melt fracture zone;
  (ii) then extruding said second portion at a rate above the melt fracture zone;
  (iii) then extruding said third portion at a rate below the melt fracture zone;
 (b) then enclosing said parison within a multipiece mold;
 (c) introducing pressure fluid into the interior of the parison within the mold to cause the parison to deflect outwardly and assume the contour of said mold and thereby produce a molded article; and
 (d) withdrawing the molded article from said mold.

6. The method of claim 5 including the step of changing the extrusion speed rapidly as it crosses the melt fracture range.

References Cited

UNITED STATES PATENTS 3,217,360 11/1965 Mason et al.
3,229,007 1/1966 Waechter et al. _____ 264—99

FOREIGN PATENTS 367,978 3/1963 Switzerland.

ROBERT F. WHITE, *Primary Examiner.*

A. R. NOE, *Assistant Examiner.*

U.S. Cl. X.R.

264—167, 209